United States Patent [19]

Munninghoff

[11] 4,067,050
[45] Jan. 3, 1978

[54] PROGRAMMED PRESENTATION SYSTEM

[75] Inventor: Clement W. Munninghoff, Cincinnati, Ohio

[73] Assignee: Cincinnati Electronics Corporation, Cincinnati, Ohio

[21] Appl. No.: 719,468

[22] Filed: Sept. 1, 1976

Related U.S. Application Data

[62] Division of Ser. No. 412,963, Nov. 5, 1973, Pat. No. 3,987,484.

[51] Int. Cl.² .......................... G11B 5/09; G11B 5/02
[52] U.S. Cl. ........................................ 360/40; 360/29
[58] Field of Search ............................. 360/40, 51, 29; 340/347 DD

[56] References Cited

U.S. PATENT DOCUMENTS

| 3,218,618 | 11/1965 | Warren | 360/40 |
| 3,573,766 | 4/1971 | Perkins, Jr. | 360/40 |
| 3,588,836 | 6/1971 | Frazier, Jr. | 360/40 |
| 3,732,364 | 5/1973 | Terada | 360/40 |
| 3,765,005 | 10/1973 | Cannon | 360/40 |

Primary Examiner—Vincent P. Canney
Attorney, Agent, or Firm—Lowe, King, Price & Markva

[57] ABSTRACT

Clock and binary NRZ signals are derived from a data track of a magnetic tape. The data track includes a pattern having a substantially constant wave length of magnetic flux variations along its length. The variations are in the form of a carrier wave having only three predetermined envelope levels. One of the levels is provided for clock pulses and the other two levels are provided for the magnitudes of the binary NRZ signals. A replica of the variations is transduced by a head into an electrical signal. First and second signals are derived in response to the electric signal to respectively indicate the carrier wave having amplitudes above first and second values of the levels. The first level is greater than the level of one of the binary signals, while the second level is greater than the first level and the level of the clock pulses. In response to the first and second signals, flip-flop circuitry derives an NRZ signal, and the clock signal is derived in response to a predetermined common level for the first and second signals. The medium is susceptible to being driven at different speed ranges, and to this end, a signal indicative of a tape speed range is derived. Retriggerable one shots are selectively enabled, depending upon the speed range. The one shots which are enabled have time periods such that they are retriggered by the first and second signals while the medium is moving in a speed range associated with enablement of the particular retriggerable one shots.

20 Claims, 5 Drawing Figures

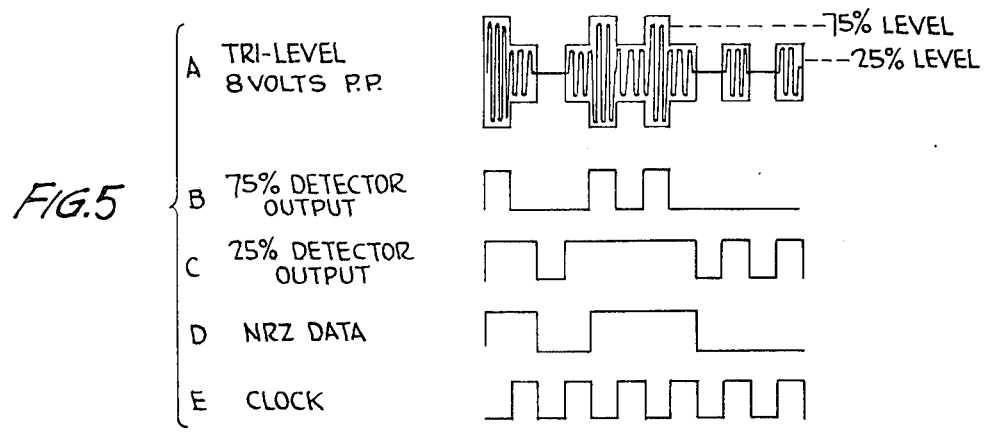
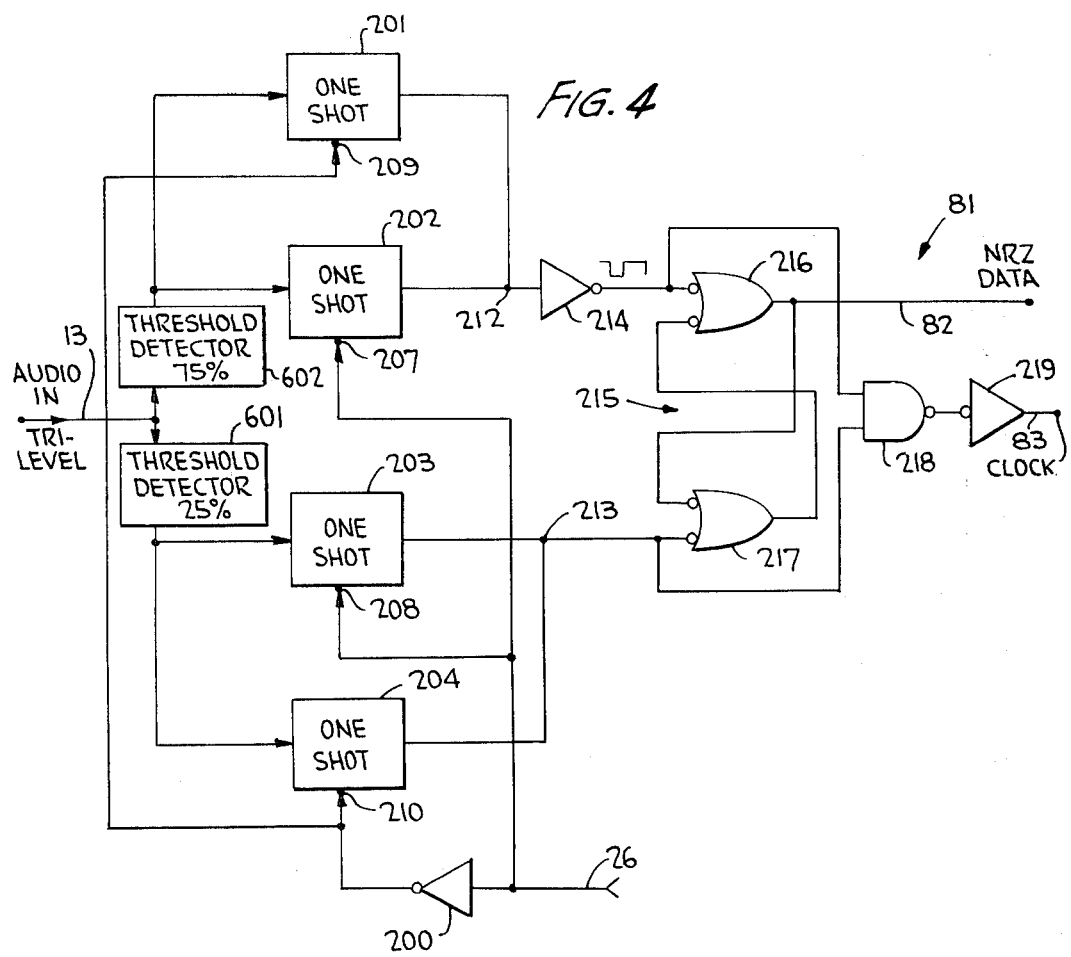

PROGRAMMED PRESENTATION SYSTEM

CROSS REFERENCE TO RELATED APPLICATION

This application is a divisional application of Application Serial No. 412,963, filed Nov. 5, 1973.

FIELD OF INVENTION

The present invention relates to a system for detecting clock and data signals on a dynamic storage medium and a data track for such a medium, and more particularly to a data track including a pattern having a substantially constant wave length of variations along the track in the form of a carrier wave having only three predetermined envelope levels, to enable clock and binary data signals to be derived.

BACKGROUND OF THE INVENTION

In the co-pending, commonly assigned application of Bosche et al, Ser. No. 412,963, filed Nov. 5, 1973, now U.S. Pat. No. 3,987,484, there is disclosed an improved programmed display system, particularly adaptable for educational and instructive purposes, wherein a generally available dynamic storage medium, such as video magnetic tape, is employed. The tape includes the usual audio and video information tracks, in the form of a longitudinal audio track for aural presentation, a longitudinal video control track and diagonal video tracks, as well as a program track which extends the length of the tape, parallel to the audio track used for the aural information. Such tapes and appropriate playback systems are available on a commercial basis.

The program track is provided with messages to indicate the position of the tape and to enable the tape to be advanced or returned to predetermined positions for branching on a selected basis in response to operator inputs to questions or situations presented to him by the aural or visual information. After a branching operation has been completed and in response to the operator activating a numerical input or clear control, the tape is automatically indexed to a designated location in the presentation medium.

The operator has the ability to index the tape to any desired location, in accordance with a directory with which he is provided, or to provide a temporary stop (pause) in the presentation of the material. The operator also may cause the tape to repeat segments of the most recently presented material relating to a particular subject, or to skip designated portions of the presented material.

To achieve the skip, repeat, indexing and branching operations and to reach the designated location in a minimum of time, the tape is selectively driven in the forward or reverse directions at speeds considerably in excess of the normal forward (play) speed and automatically pauses upon arrival at those locations. Also, the tape can be driven, at will, at high speed in either direction in response to commands from the operator.

Because the tape can be driven at widely varying speeds, over at least a 10:1 speed ratio, the detection of tape location information from the program track presents certain problems, relating, for example, to the variable frequency of the program track signals, tape jitter (f.m.), and frequency response of pick-up heads and playback circuits. In addition, to enable the system to be utilized with commercially available systems, only one program track can be employed.

BRIEF DESCRIPTION OF THE INVENTION

As a result of these limitations, the program track utilizes a trilevel, audio carrier envelope. Binary bits which provide the data on the program track are represented by envelopes having zero and a predetermined, maximum envelope, while clock pulses, associated with each binary bit, are represented by an envelope having an amplitude one-half of that of the predetermined maximum. Detection of the envelope amplitude is provided by a network including threshold detectors and retriggerable one shot multivibrators, which preclude response time problems of conventional audio detectors employing low pass filters and rectifiers.

An object of the present invention is to provide a new and improved system for deriving binary signals from a magnetic tape track capable of being driven at widely variable speeds.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 4 is a schematic diagram of a preferred embodiment of the present invention;

FIGS. 5A–5E are waveform illustrations in the FIG. 6 demodulator;

DETAILED DESCRIPTION OF THE DRAWING

Figure 1:
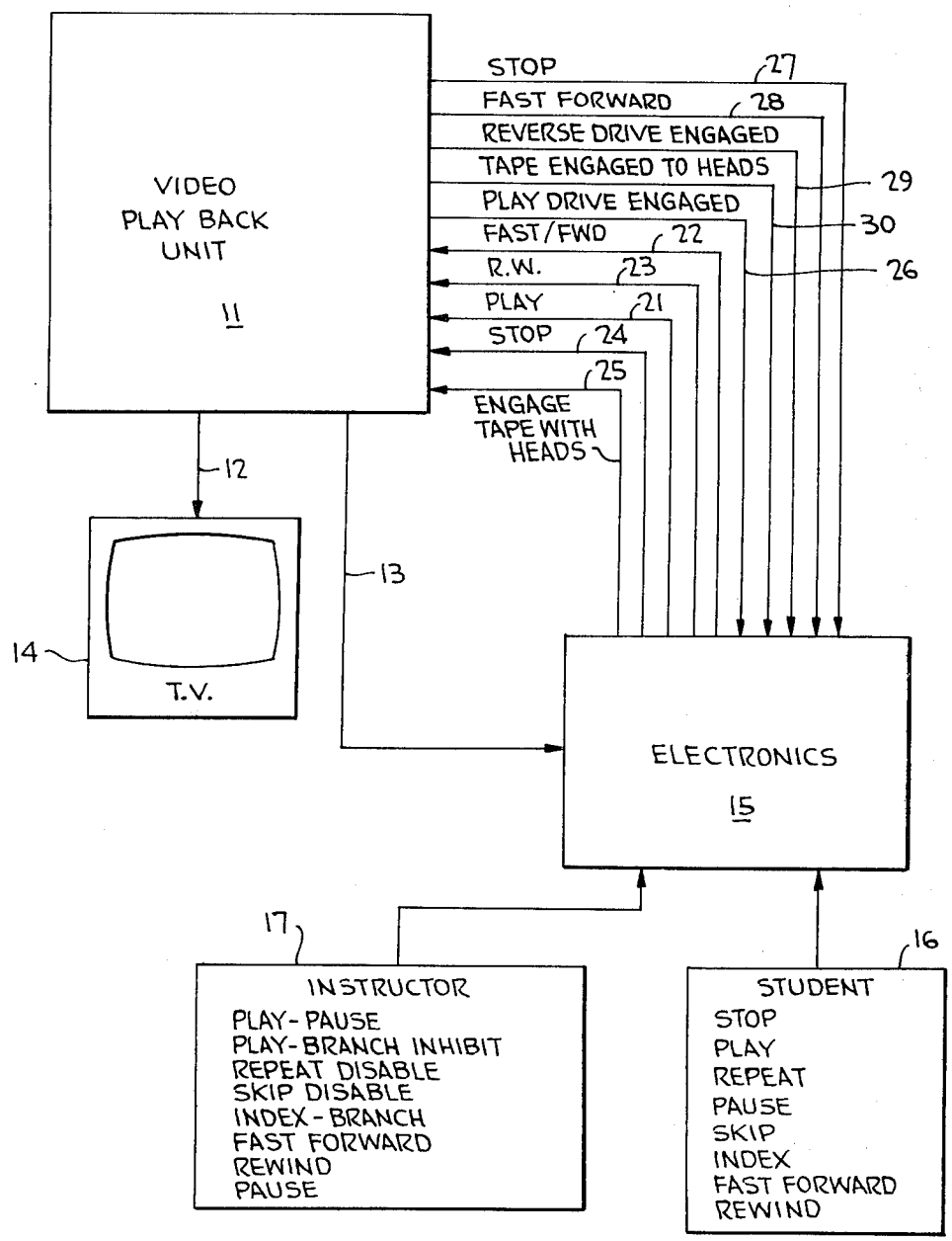
FIG. 1 is an overall block diagram of a preferred device with which the present invention is utilized.

Reference is now made to FIG. 1 of the drawing wherein there is illustrated in block diagram form the overall organization of a system including the present invention. The system includes a video, magnetic playback unit 11 for deriving a composite video and audio output signal on lead 12 and an audio output on lead 13. The composite audio-video signal on lead 12 has a format corresponding with a conventional television format, as prescribed for example by U.S. standards. The video magnetic playback unit 11, therefore, is of conventional design and is preferably of a type responsive to a dynamic storage medium, preferably a magnetic tape of a video tape cartridge or cassette. Such cartridge or cassette playback units generally include one or more rotating magnetic playback heads, a pair of stationary audio playback heads, employed to derive audio information corresponding with the video information and a head employed for video head to video tape positioning. The composite signal derived from one of the stationary audio heads and the rotating magnetic heads is supplied via closed circuit television lead 12 to a conventional television receiver 14 which provides aural and visual signals to an operator, who is preferably a student or technician being taught particular instructional material. Frequently, the instructional material relates to procedures to repair a particular type of equipment, such as a radio receiver. In certain instances, the video portion of the playback unit can be eliminated and an acoustic output device can be substituted for the television receiver.

The other audio track on the tape of playback unit 11 supplies lead 13 with a signal indicative of the relative location of the tape and the playback heads, as well as other information relating to the content of the signal supplied to lead 12 and instructions for enabling certain segments of the information supplied to lead 12 to be derived in appropriate sequence. The audio signal on lead 13 is supplied to an electronics network 15 that is also responsive to signals derived from an operator (student) station 16, as well as to signals from a supervisory (instructor) station 17. Student station 16 includes a matrix of manually operated keys, ten of which are used to supply numerical information to network 15, while the remaining nine keys supply function signals to the electronics network to control the movement of the tape of playback unit 11. Instructor station 17 includes several input switches to selectively enable certain of the command functions which can be supplied to the electronics network 15 from station 16.

In response to the signals from audio source 13 and the student and instructor stations 16 and 17, electronics network 15 derives signals on leads 21-25 to control the movement of the tape of playback unit 11. In particular, network 15 supplies binary signals to playback unit 11 on leads 21, 22, 23 and 24 to enable the playback unit to be driven in a forward direction at normal speed (play), to advance the tape at a fast speed (typically ten to thirty times the normal, play speed of 3.75 inches per second), to rewind the tape at a relatively fast speed, and to stop the tape. A further binary signal is supplied by electronics network 15 to tape playback unit 11 on lead 25 to cause the tape and the playback heads to be urged into engagement with each other. Magnetic playback unit 11 is provided with motors and tape engaging actuators, as well as circuitry for enabling the motors and tape engaging actuators to be automatically driven in response to command signals from the electronics network 15, as derived on leads 21-25.

To provide signals indicative of the manner in which the magnetic tape of unit 11 is being driven, and whether the tape is in engagement with the playback heads, the playback unit is provided with appropriate signal sources which derive binary signals on leads 26-30, whereby binary one levels are derived on leads 26-30 in response to: (a) the tape being driven forward at the normal speed (play drive engage), (b) the tape being stopped, (c) the tape being driven in the forward direction at high speed, (d) the tape being driven in the reverse direction (always at high speed), and (e) the tape being in engagement with the audio and video heads of the playback unit. The signals on leads 26-30 are supplied to electronics network 15 and, together with the signals from sources 16 and 17 and the audio signal on lead 13, control the derivation of the binary signal levels on leads 21-25 to control the tape movement and engagement with the pickup heads.

Figure 2:
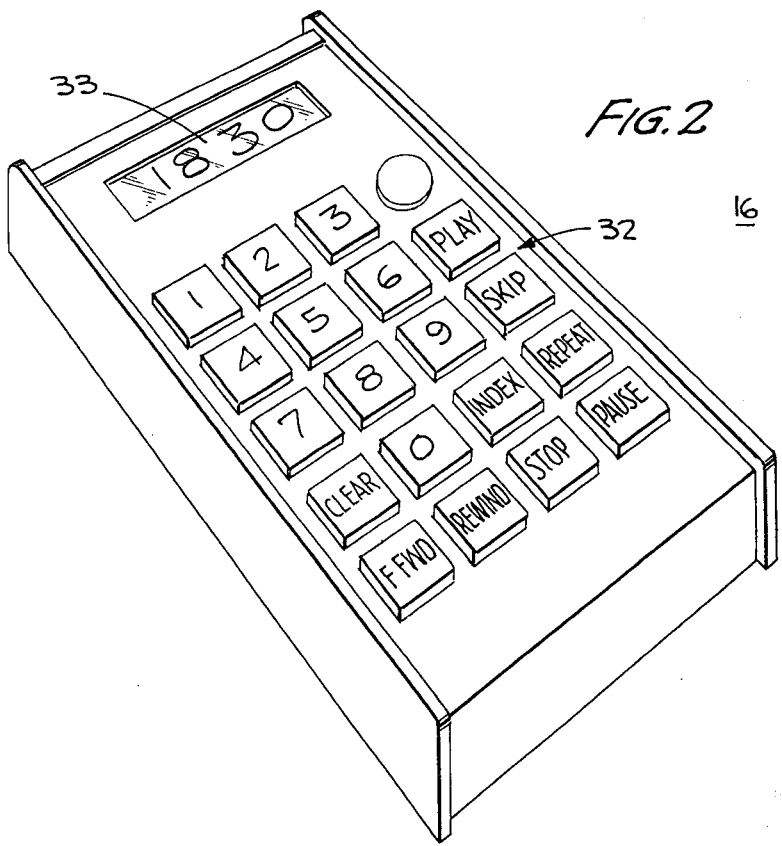
FIG. 2 is an illustration of an operator station for use in conjunction with the device of FIG. 1.

As illustrated in FIG. 2, the operator station 16 is preferably a hand-held unit, approximately the size of a modern hand-held electronic calculator. Station 16 is provided with a keyboard matrix 32 of nineteen keys, ten of which are provided for the numerals 0-9. Numerals 0-9 enable the operator to supply command signals to electronics network 15 for indexing or branching to a particular location of the tape on playback unit 11. The operator is provided with a directory that provides a correlation between certain locations on the magnetic tape and certain portions of the material in which he may be interested. To enable the operator to determine the number he has entered by depressing the 10 numeric indicating keys, station 16 is provided with a four-digit numerical display 33.

The remaining nine keys are for supplying instructional or command signals to electronics network 15 to enable the operator to selectively drive the tape in the forward direction at a fast speed, to rewind the tape, to stop the tape, to pause, i.e., temporarily stop the tape, to repeat a certain portion of the lesson or material on the tape, to skip certain portions of the tape, to drive the tape in the normal forward direction at a normal speed wherein the operator can obtain meaningful audio and visual information from television receiver 14, and to command entry of any selected four-digit location of the tape into the electronics network (index). The matrix 32 is also provided with a "clear" key to enable any prior entry which has been supplied to the keyboard to be cleared prior to execution of a new entry by the electronics network 15.

Figure 3:
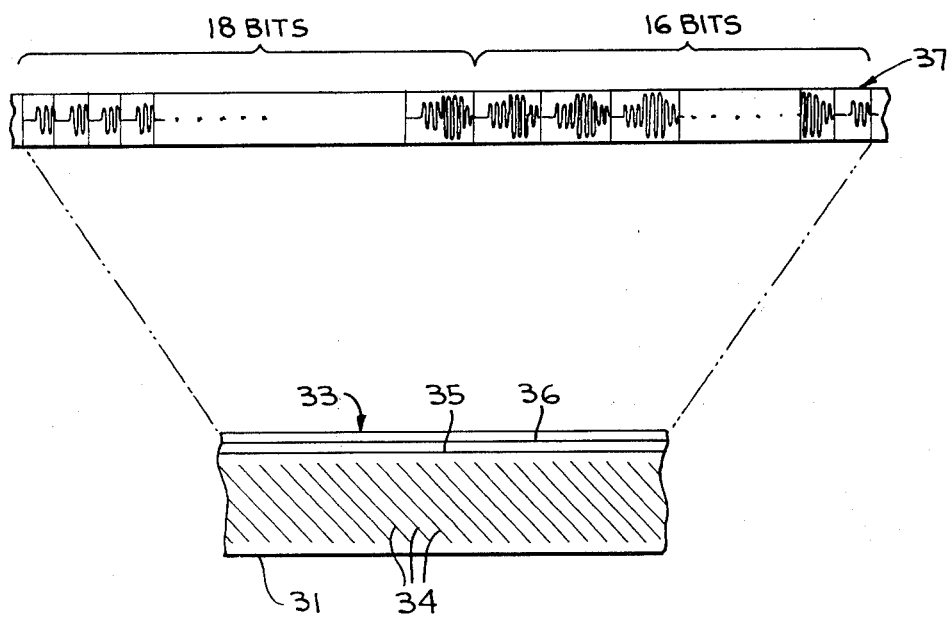
FIG. 3 is a schematic representation of a video magnetic tape employed in the device of FIG. 1.

Reference is now made to FIG. 3 of the drawing wherein there is illustrated in schematic form, a portion of the magnetic tape 33 which is employed in magnetic playback unit 11. Tape 33 is relatively wide, for example, $\frac{1}{2}$ inch, and includes a multiplicity of parallel diagonal, video tracks 34, one of which is provided for each frame presented on the screen of television receiver 14. A skip field technique is preferably employed for recording and picking up the video tracks 34, whereby three rotating heads are included in the playback unit 11 to this end and, the length of tape 33 is generally one-third of that of more conventional type tapes. It is to be understood, however, that conventional, non-skip field units or other types of mediums can be utilized to store the presented video information.

On the side of the video track 34, first and second parallel audio tracks 35 and 36 are provided. Tracks 35 and 36 are positioned to provide corresponding information for the video track 34, with track 35 providing sound information to the television receiver 14. Audio track 36, however, provides the longitudinal position of the audio and video information of tracks 34 and 35 from the beginning of the tape, in addition to other command codes. At the normal play speed of tape 33 the information recorded in track 36 represents time, as measured in seconds, from the beginning of the tape. Thereby, for each second of the normal movement of tape 33 through the playback unit 11, a different time indication is derived from track 36 and supplied to electronics network 15 by a lead 13, except for time slots requiring other codes, in which case time indication is omitted.

A preferred format for each second, i.e., word, of track 36 is illustrated in enlarged form on FIG. 3, by the rectangle 37 removed from the remainder of the tape. As seen in rectangle 37, 1 second of track 36 includes 34 sequential binary bits. Each bit includes a data segment followed by an equal length clock segment. The data segments are recorded as a variable amplitude audio carrier wave having an envelope of predetermined maximum magnitude or zero magnitude, respectively, representing binary one and zero values. The clock portion of each bit is a carrier having an envelope midway between the maximum envelope of the binary one value and the zero envelope of the binary zero value. For the normal tape speed, each data bit portion and each clock bit portion include five cycles of a 340 Hertz carrier. Of course, as the magnetic playback unit is being driven at a high speed, either in the fast forward or reverse modes, the frequency of the audio carrier supplied to lead 13 increases, usually to in excess of ten times the normal frequency. Since a quantized, amplitude modulation pulse system is employed, rather than more conventional types of coding, detection of the coded data on track 36 is obtained despite tape jitter and the variable tape speed. The audio modulation system is also desirable because existing record-playback circuits can be employed and the normal audio response of conventional audio heads at the variable tape speeds employed are compatible with the carrier frequency, even at the high speed. Because only one audio track is available for coding on some commercially available playback units, parallel track approaches are not as feasible as the single program track employed herein. An audio demodulator 81, FIG. 4, is responsive to the audio signal on lead 13 and the tape speed indicating signal on lead 26. In response to the audio signal and the speed indicating signal, audio demodulator 81 derives a serial non-return to zero binary signal on lead 82 and a series of clock pulses on lead 83. One clock pulse is derived on lead 83 for each binary bit of the signal on lead 13. Transitions of the binary signal on lead 82 are coincident with the beginning and end of a full bit of the audio signal on lead 13, i.e., the leading edge of each binary bit on lead 82 is synchronized with the beginning of the data portion of each bit of the audio signal, while the trailing edge of each binary bit on lead 82 is synchronized with the trailing edge of the clock portion of selected audio signal binary bits. Demodulator 81 is responsive to the speed indicating signal to effectively change the response time of circuitry included in the demodulator and enable accurate signals to be derived on leads 82 and 83 over the ten to one or more speed ratio of the tape movement through playback unit 11.

Greater consideration is now given to audio demodulator 81, by reference to FIGS. 4 and 5, which respectively are a schematic diagram of the demodulator and illustrations of waveforms supplied to and derived by the demodulator. Basically, the demodulator responds to the audio input signal on lead 13 to derive signals indicative of whether the amplitude of the audio envelope is approximately at a zero level, approximately at one-half of the maximum value, or equal to the maximum value. In response to the zero or maximum value envelope, non-return to zero binary signals are derived on lead 82, while in response to each audio signal having an envelope of approximately one-half the maximum value, a clock pulse is derived on lead 83. The derivation of the signals on leads 82 and 83 occurs regardless of the speed of tape 33.

To provide detection of the amplitude of the audio carrier on lead 13, threshold detector circuits 601 and 602 are driven in parallel by the signal on lead 13 and provide binary one signals in response to the positive amplitude of the sinusoidal carrier on lead 13. Detectors 601 and 602 derive binary one outputs when the input amplitude of the audio signal on lead 13 is greater than 25 percent and 75 percent, respectively, of the full amplitude of the carrier. Retriggerable one shot multivibrators 201-204 are provided to decode the envelope of the audio signal. The time period of the one shot multivibrators is established such that they are always retriggered by the outputs of the threshold detectors before the normal time out periods thereof as long as the tape speed is above a predetermined value established by the frequency of the audio carrier and the tape speed changes.

Two pairs of retriggerable one shots are provided for each envelope amplitude detector to enable the circuit to detect audio carriers having differing frequencies, as result from driving the tape at different speeds. In response to the tape being driven at a normal speed multivibrators 202 and 203 are enabled, while multivibrators 201 and 204 are enabled in response to the tape being driven at high speed in either the forward or reverse direction. Enabling of the one shots 202-203 is provided by supplying the play indicating signal on lead 26 to enable input terminals 207 and 208 of one shots 202 and 203. One shots 201 and 204 are enabled while the tape is moving at high speed in either direction by coupling the signal on lead 26 through inverter 200 and thence to enable input terminals 209 and 210 of these one shots. Even though one shots 201 and 204 are enabled while the tape is stopped, such enabling does not result in any finite output signal from the one shots because no signals are supplied to them from detectors 601 and 602. The use of retriggerable one shots is preferable over other types of audio detectors, such as a diode driving a low pass filter, because five cycles of the signal are not generally enough to provide the required charging and discharging of capacitors of such detectors.

It is to be understood that while only two pairs of one shots are illustrated for each speed detection range, additional one shots may be added, if the fast forward and rewind rates of the tape in some other tape players have an excessively wide speed range. All of the one shots associated with a particular envelope amplitude are connected to common input and output terminals, whereby the one shots 201 and 202 for detecting 75 percent of the maximum envelope amplitude are connected to output terminal 212 while the one shots 203 and 204 for detecting an envelope amplitude of 25 percent or more of the maximum amplitude are connected to output terminal 213.

It is thereby seen that in response to a data half bit having the maximum amplitude, binary one levels are derived at terminals 212 and 213, while a binary one level is derived on terminal 213 to the exclusion of terminal 212 in response to a clock half bit being supplied to lead 13. Binary zero levels are derived on terminals 212 and 213 in response to a zero amplitude envelope. For the exemplary input waveform on lead 13, indicated by FIG. 7A, the signals at terminals 212 and 213 are represented by the waveforms of FIGS. 7B and 7C, respectively.

To convert the signals at terminals 212 and 213 into non-return to zero (NRZ) and clock signals derived from leads 82 and 83 respectively and indicated by waveforms 7D and 7E, the signals at terminals 212 and 213 are coupled to a flip-flop 215 comprising cross-coupled NOR gates 216 and 217, and to input terminals of NAND gate 218. Coupling of the signal at terminal 212 to flip-flop 215 and the input of NAND gate 218 is via inverter 214. The output of flip-flop 215, at the output terminal of NOR gate 216, is directly coupled to lead 82, while the output of NAND gate 218 is supplied through inverter 219 to lead 83. It is noted that the NRZ waveform of FIG. 7D has positive transitions substantially coincident with the leading edges of full bits of the waveform of FIG. 7A, while the clock pulses of FIG. 7E are substantially coincident with the half maximum amplitude envelopes of FIG. 7A.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A system for detecting clock and binary data signals on a moving magnetic tape comprising a track on the tape having a relatively constant frequency audio carrier while the tape is moving at a substantially constant speed, said carrier having three predetermined envelope amplitude levels, two of said levels being associated with different binary values, and the third level being associated with clock pulses, playback means responsive to the audio carrier, said playback means including means for detecting the three amplitude levels of the carrier, and means responsive to the detected amplitude levels for deriving signals indicative of the magnitude of the binary data and of the occurrence of the clock pulses.

2. The system of claim 1, wherein the tape is susceptible to being driven at different speed ranges, further including means for deriving a signal indicative of a speed range for the tape, and means responsive to the speed range indicating signal for controlling response times of the detecting means.

3. The system of claim 1, wherein the detecting means includes means for deriving pulses having predetermined lengths dependent upon the speed of the tape and the frequency of the carrier.

4. The system of claim 3, wherein the tape is susceptible to being driven at different speed ranges, further including means for deriving a signal indicative of a speed range for the tape, and means responsive to the speed range indicating signal for controlling the lengths of the pulses.

5. A moving magnetic medium comprising a magnetic data track, said track including a repetitive pattern of magnetic flux variations, said pattern having a substantially constant wavelength along the track, said flux variations being in the form of a carrier wave having only three predetermined envelope levels, one of said levels being provided for clock pulses and the other two levels being provided for the magnitudes of binary signals.

6. The medium of claim 5, wherein the carrier wave is an audio frequency at the speed of the medium.

7. The medium of claim 5, wherein one of said levels is zero, a second of said levels is a predetermined maximum excursion of the carrier wave, and the third level is approximately one-half the maximum excursion.

8. A system for detecting clock and binary data signals on a dynamic storage medium comprising a track on the medium having a relatively constant frequency audio carrier while the medium is moving at a substantially constant speed, said carrier having three predetermined envelope amplitude levels, two of said levels being associated with different binary values, and the third level being associated with clock pulses, playback means responsive to the audio carrier, said playback means including means for detecting the three amplitude levels of the carrier, and means responsive to the detected amplitude levels for deriving signals indicative of the magnitude of the binary data and of the occurrence of the clock pulses.

9. The system of claim 8, wherein the medium is susceptible to being driven at different speed ranges, further including means for deriving a signal indicative of a speed range for the medium, and means responsive to the speed range indicating signal for controlling response times of the detecting means.

10. The system of claim 8, wherein the detecting means includes means for deriving pulses having predetermined lengths dependent upon the speed of the medium and the frequency of the carrier.

11. The system of claim 10, wherein the medium is susceptible to being driven at different speed ranges, further including means for deriving a signal indicative of a speed range for the medium, and means responsive to the speed range indicating signal for controlling the lengths of the pulses.

12. A dynamic storage medium comprising a data track, said track including a repetitive pattern of physically detectable variations, said pattern having a substantially constant wavelength of the variations along the track, said variations being in the form of a carrier wave having only three predetermined envelope levels, one of said levels being provided for clock pulses and the other two levels being provided for the magnitudes of binary signals.

13. The medium of claim 12, wherein the carrier wave is an audio frequency at the speed of the medium.

14. The medium of claim 12, wherein one of said levels is zero, a second of said levels is a predetermined maximum excursion of the carrier wave, and the third level is approximately one-half the maximum excursion.

15. Apparatus for detecting clock and binary NRZ signals comprising a dynamic storage medium including a data track for the signals, said track including a repetitive pattern of physically detectable variations, said pattern having a substantially constant wavelength of the variations along the track, said variations being in the form of a carrier wave having only three predetermined envelope amplitude levels, one of said levels being provided for clock pulses and the other two levels being provided for the magnitudes of binary signals, means for transducing the variations into an electric signal that is a replica of the transduced variations, amplitude detection means for deriving first and second signals respectively indicative of the carrier wave having amplitudes above first and second of said levels, said first level being greater than the level of one of said binary signals, said second level being greater than the level of said clock pulses, said second level being greater than the first level, and means responsive to said first and second signasl for deriving an NRZ signals and a clock signal having transitions synchronized with the NRZ signal.

16. The apparatus of claim 15 wherein the medium is susceptible to being driven at different speed ranges, further including means for deriving a signal indicative of a speed range for the medium, and means responsive to the speed range indicating signal for controlling the lengths of pulses comprising the first and second signals.

17. The apparatus of claim 16 wherein the length controlling means includes first, second, third and fourth retriggerable one shots, means for enabling said first and second one shots while the medium is moving in a first speed range, means for enabling said third and fourth one shots while the medium is moving in a second speed range, said first and second one shots being responsive to the first signal, said third and fourth one shots being responsive to the second signal, said first and second one shots having time periods such that they are retriggered by the first and second signals while the medium is moving in the first speed range, said third and fourth one shots having time periods such that they are retriggered by the first and second signals while the medium is moving in the second speed range.

18. The apparatus of claim 15 wherein the means for deriving the NRZ signal includes a flip-flop responsive to the first and second signals.

19. The apparatus of claim 15 wherein the means for deriving the clock signal includes means for detecting a predetermined common level for first and second signals.

20. The apparatus of claim 19 wherein the means for deriving the NRZ signal includes a flip-flop responsive to the first and second signals.

* * * * *